United States Patent [19]
Sakasegawa et al.
[11] 3,965,360
[45] June 22, 1976

[54] METHOD FOR DISCRIMINATING HIGH-TEMPERATURE RED HEATED MATERIAL

[75] Inventors: Koji Sakasegawa; Atsushi Ohsumi; Tatsue Saito; Yukio Hosaka, all of Fukuyama; Kazuo Kunioka, Yokohama; Tomio Yamamoto, Takamatsu; Tadashi Asai, Kobe, all of Japan

[73] Assignees: Nippon Kokan Kabushiki Kaisha, Tokyo; Fuji Toyuki Kabushiki Kaisha, Kagawa; Asai Yushi Kogyo Kabushiki Kaisha, Kobe, all of Japan

[22] Filed: Aug. 19, 1974

[21] Appl. No.: 498,371

[30] Foreign Application Priority Data

Aug. 22, 1973 Japan .............................. 48-93282

[52] U.S. Cl. .......................... 250/461 R; 250/372; 250/484

[51] Int. Cl.$^2$ ...................................... G01M 21/38

[58] Field of Search .......... 73/356, 355 R; 250/461, 250/484, 372, 302, 461, 483; 356/51, 72, 237, 244, 256, 43

[56] References Cited

UNITED STATES PATENTS

| | | | |
|---|---|---|---|
| 2,085,508 | 6/1937 | Neuber | 250/461 |
| 2,792,484 | 5/1957 | Gurewitsch et al. | 73/355 R |
| 2,945,954 | 7/1960 | Gaugler | 73/356 |
| 3,256,518 | 6/1966 | Crane | 73/356 |
| 3,575,873 | 4/1971 | Carver | 250/484 |
| 3,591,810 | 7/1971 | Jackson | 73/356 |
| 3,610,932 | 10/1971 | Morse | 250/484 |

*Primary Examiner*—Harold A. Dixon
*Attorney, Agent, or Firm*—Flynn & Frishauf

[57] ABSTRACT

In heating a material radiant at high temperatures, such as a steel product, in a heating furnace, the said material is charged into the heating furnace to heat. A discrimination mark is previously drawn on the surface of material to be discriminated on a portion readily watched from outside the furnace. A heat resisting paint sensitive to near ultraviolet rays is used to make the mark. The said material radiant-heated in the heating furnace is discriminated from outside the furnace as being radiant by applying near ultraviolet rays of a high pressure mercury lamp thereto from outside the furnace to provide a sharp contrast between the said material surface and the said discrimination mark for the discrimination of the said mark from outside the furnace.

9 Claims, 4 Drawing Figures

METHOD FOR DISCRIMINATING HIGH-TEMPERATURE RED HEATED MATERIAL

FIELD OF THE INVENTION

This invention relates to a method of discriminating a radiant-heated material in a heating furnace by making use of near ultraviolet rays.

BACKGROUND OF THE INVENTION

In heating a material radiant at high temperatures, such as a steel product for example, in a heating furnace, it is a usual practice to heat many materials different in quality, shape and size in the same furnace and at the same time. In such a case, it is necessary to take some measures to definitely discriminate from outside the furnace a specific material as being radiant from among many materials so heated.

The method conventionally employed for this discrimination is to draw a discrimination mark in advance on the surface of the material to be charged into the furnace with a heat resisting paint and then to discriminate the material radiant-heated in the furnace with the naked eyes from outside the furnace.

In a heating furnace using heavy oil or coke as fuel, however, it has been difficult to definitely discriminate the material radiant-heated in the furnace as such from outside the furnace by the above-described conventional method. The reasons are as follows. In a heating furnace using heavy oil or coke as fuel, the radiant-heated material in the furnace and the discrimination mark drawn on its surface are shielded by gases generated therein such as $CO_2$ and $C_2H_2$. Spectra radiant therefrom are not only in a state different from spectra outside the furnace but are also unstable in distribution. Accordingly, however excellent in heat resistance and adherence, the discrimination mark observed from outside the furnace is not clear at all in contrast and does not permit easy discrimination. As a result, it becomes difficult to discriminate from outside the furnace the radiant-heated material in the furnace as being radiant (e.g. heated to redness, yellowness, whiteness, etc.).

An object of this invention is therefore to provide a method of definitely discriminating from outside the furnace a material radiant-heated in a heating furnace as being so heated, as well as of eliminating the disadvantages found in the conventional method as mentioned above.

More specifically, the principal object of this invention is to provide a method of definitely discriminating from outside the furnace a discrimination mark previously drawn on the surface of material radiant-heated in a heating furnace by making use of near ultraviolet rays of a high pressure mercury lamp.

SUMMARY OF THE INVENTION

In accordance with the present invention, there is provided a method comprising placing a discrimination mark of a heat resisting paint sensitive to near ultraviolet rays on the surface of a material to be discriminated, heating said material in a heating furnace, applying near ultraviolet rays from a source located outside of the furnace to the said material radiant-heated in the heating furnace, and observing the said discrimination mark from outside the furnace.

DETAILED DESCRIPTION OF PREFERRED EMBODIMENTS

With regard to the paint to be used for drawing the discrimination mark on the surface of material in this invention, any paint having excellent heat resistance and adherence, and sensitive to near ultraviolet rays, can be employed. Examples include ceramic type paints containing a chromate, and as shown in the table below, paints composed of a manganese frit and potassium silicate ($nSiO_2.K_2O$), and paints composed of a zirconium frit and the said potassium silicate. Typical paints are illustrated in the following table:

| Paint | Wt% | Wt% |
|---|---|---|
| Manganese frit | 24.32 | — |
| Zirconium frit | — | 13.39 |
| Potassium silicate ($nSiO_2.K_2O$) | 48.75 | 23.63 |
| Heat resisting pigment, dispersant, etc. | 26.93 | 62.98 |
| | 100.00 | 100.00 |

A discrimination mark such as a numeral, letter, pattern or symbol is previously drawn with any of the above-mentioned paints, on an advantageous portion of the surface of the discrimination-requiring material such that it can be observed easily from outside the furnace. The material so marked is charged into the heating furnace for heating, using heavy oil or coke as a fuel.

Figure 4:
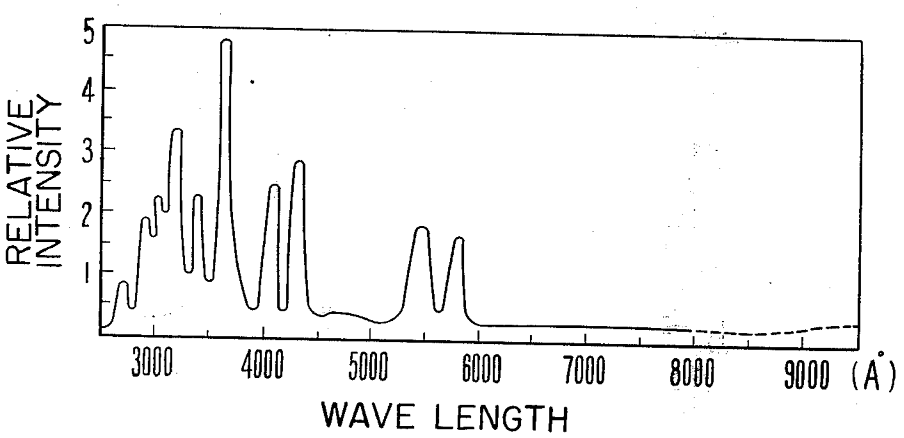
FIG. 4 is a drawing showing the distribution of spectra of a high pressure mercury lamp.

Near ultraviolet rays with a high density wave length of approximtely 4358A of the spectra of a high pressure mercury lamp illustrated in FIG. 4 is recommended for use in this invention. In applying the near ultraviolet spectra with the said wave length from outside the furnace to the said radiant-heated material in the furnace carrying a discrimination mark, gases generated in the furnace such as $CO_2$ and $C_2H_2$ shield the said material and bring about a phenomenon of excitation. As a result, a very sharp contrast is presented in the area covered by the near ultraviolet spectra with the said wave length, so that the said discrimination mark is clearly observed from outside.

The following is a more detailed description of examples of application of the present invention with reference to the drawings.

EXAMPLE 1

Figure 1:
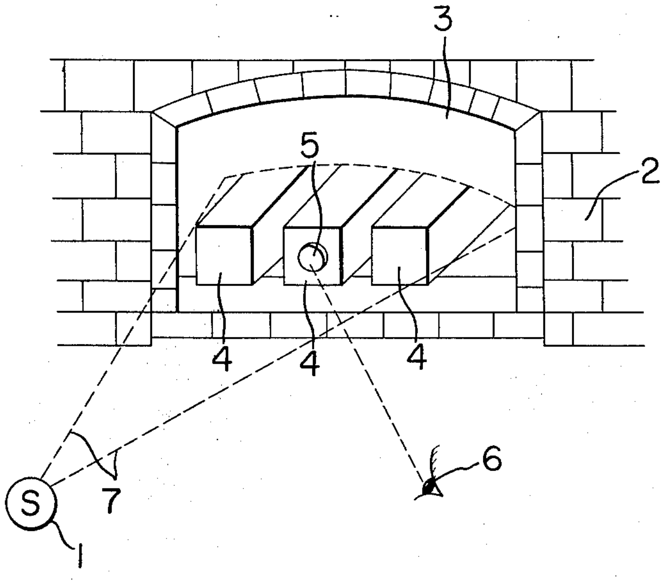
FIGS. 1, 2 and 3 are schematic illustration showing the application of this invention.

Example 1 is an embodiment in which the discrimination mark is watched by the naked eyes, FIG. 1 schematically representing an outline thereof. In FIG. 1, 2 indicates the wall of a heating furnace, and 3, the eyehole of the heating furnace. First, a discrimination mark 5 is drawn with a ceramic type paint containing a chromate on a particular material requiring discrimination out of several steel materials 4 to be heated, and then the marked and unmarked steel materials 4 are charged into the heating furnace and heated therein for 3 hours at about 1,360°C. Then, near ultraviolet spectra of approximately 4358A are applied from light source 1 of a high pressure mercury lamp to the steel materials 4 radiant-heated in the furnace within the area indicated by broken line 7 through eyehole 3, and the said steel materials 4 are observed from outside the furnace with the naked eyes. The said discrimination mark 5 is discriminated distinctly from the unmarked steel materials 4 because of a sharp contrast between the said discrimination mark and the surfaces of the steel materials 4. Further, in cases where a discrimination mark is drawn with a paint containing the manganese frit and potassium silicate, and a paint containing a zirconium frit and potassium silicate, as illustrated above, satisfactory results are similarly obtained.

EXAMPLE 2

Figure 2:
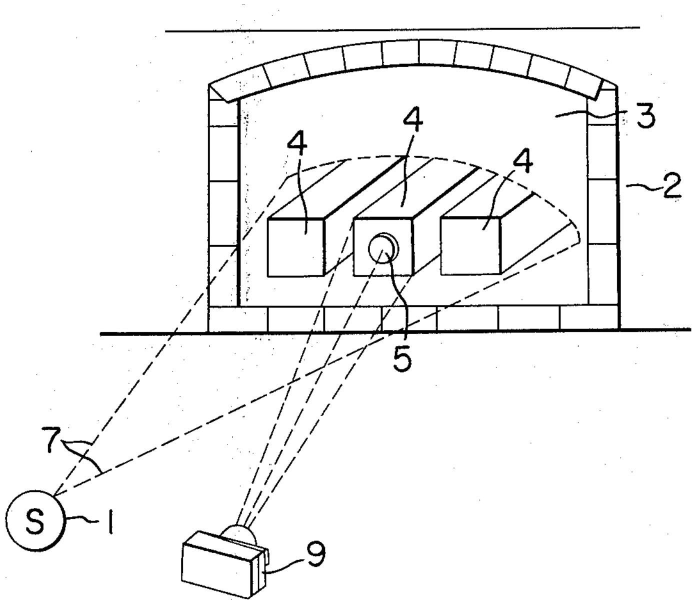

This example is an embodiment in which the discrimination mark is observed through a photographic record, FIG. 2 being a schematic drawing thereof. Example 2 is similar to Example 1, the only difference being a photographic discrimination taking the place of the discrimination with the naked eyes in Example 1.

Just as in Example 1, a discrimination mark is drawn on a particular material among several steel materials 4 to be heated; marked and unmarked steel materials 4 are charged into a heating furnace and heated therein; near ultraviolet spectra of approximately 4358A is applied from the light source 1 of the high pressure mercury lamp to the steel materials 4 radiant-heated in the furnace within the area indicated by broken line 7 through the eyehole 3 of the heating furnace. Then, the interior of the furnace is photographed by camera 9 positioned outside the furnace through the eyehole 3 of the heating furnace. Before taking a photograph, the camera 9 is equipped in front of its lens with a band-pass filter which transmits exclusively near ultraviolet spectra with the said wave length, resulting in an image of very sharp contrast for the distinct discrimination of the mark 5.

EXAMPLE 3

Figure 3:
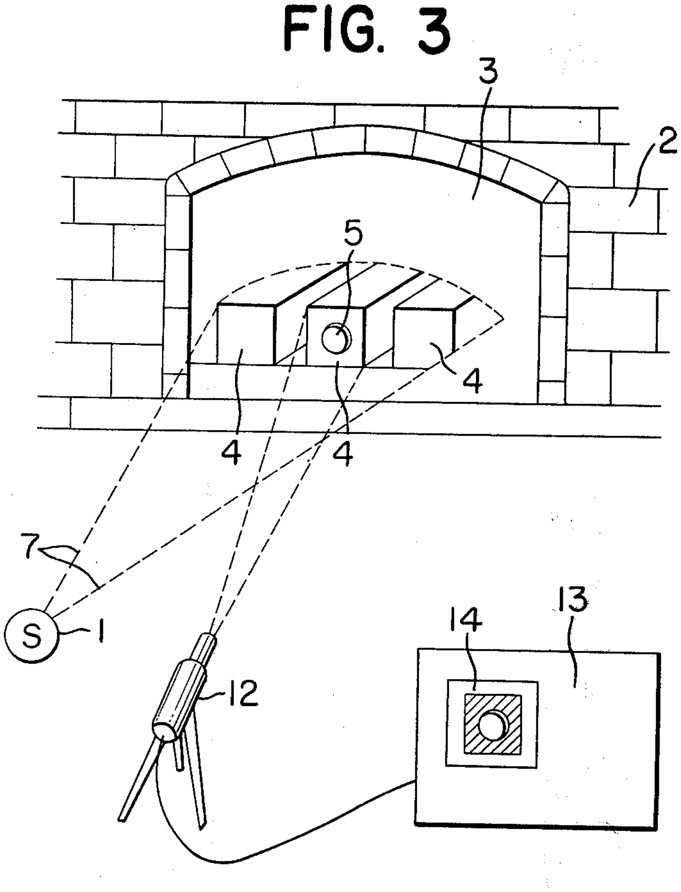

This example is an embodiment for the discrimination using a TV camera having a vidicon tube, FIG. 3 being a schematic drawing thereof. Example 3 is similar to Examples 1 and 2, the only difference being the discrimination by a vidicon device taking the place of that with the naked eyes in Example 1 and the photographic discrimination in Example 2.

Just as in Example 1, a discrimination mark 5 is drawn on a particular material among several steel materials 4 to be heated; the marked and unmarked steel materials 4 are charged into a heating furnace and heated therein; near ultraviolet spectra of approximately 4358A are applied from the light source 1 of the high pressure mercury lamp to the steel materials 4 radiant-heated in the furnace within the area indicated by the broken line 7 through the eyehole 3 of the heating furnace. Then, the interior of the furnace is photographed by means of TV camera 12 positioned outside the furnace and is visually reproduced onto screen 14 of TV monitor 13. The interior of the furnace is so photographed through the eyehole 3. Before taking the photograph, the TV camera 12 is equipped in front of its lens with a band-pass filter which transmits exclusively near ultraviolet spectra with the said wave length of approximately 4358A, and in addition to this, a vidicon tube (not shown) having a high sensitivity to near ultraviolet spectra with the said wave length is used in the TV camera 12. This joint use of the said band-pass filter and the said vidicon gives an image having a very sharp contrast on the screen 14 of the TV monitor 13 to enable distinct discrimination of the mark 5. In FIG. 3, 2 indicates the wall of the heating furnace.

Examples 1–3 are embodiments in which this invention is applied to steel materials as the material to be heated. It is needless to say, however, that this invention is applicable not only to steel materials but also to the other materials radiant at high temperatures. For example, a discrimination mark is drawn on a concrete block composed of Portland cement with the said paint, and the block is heated in a heating furnace at a heating temperature of 1,000°C. Near ultraviolet spectra of approximately 4358A are applied similarly to the block after the block has been heated for 20 hours, then 40 hours and then 72 hours. In all cases, the said discrimination mark is clearly observed by the naked eyes from ouside the furnace.

As mentioned above, this invention is very useful industrially by the utilization of near ultraviolet rays from a high pressure mercury lamp permitting distinct discrimination from outside the furnace of the discrimination mark on the surface of material radiant-heated in the furnace without being impaired by gases generated in the heating furnace such as $CO_2$ and $C_2H_2$.

As used herein, the term near ultraviolet rays means ray of from about 4348A to about 4358A. Such rays can be provided by using a high pressure (about 23kg/cm$^2$– about 30kg/cm$^2$) mercury lamp.

What is claimed is:

1. A method of discriminating a material radiant at high temperatures in a heating furnace as being radiant from outside the furnace, comprising:

previously placing a discrimination mark on the surface of a material to be discriminated from other materials to be heated in said furnace with a paint which is sensitive to near ultraviolet rays of wavelength of approximately 4358A, said paint being comprised of a manganese frit and a potassium silicate, charging said marked material together with unmarked materials into said heating furnace for radiant heating, projecting near ultraviolet rays of a high pressure mercury lamp from outside said furnace to said materials radiant-heated in said furnace, said near ultraviolet rays having a wavelength of approximately 4358A, said painted discrimination mark being responsive to said near ultraviolet rays impinging thereon to produce a visual sharp-contrast indication between the unpainted surface portion and said discrimination mark of said marked material, and photographing the interior of said furnace while said materials are radiant with a camera having a band-pass filter which transmits substantially exclusively said near ultraviolet rays of wavelength of approximately 4358A in front of the camera lens to discriminate the marked material from the unmarked material while they are radiant.

2. A method of claim 1, wherein said marked material comprises a steel.

3. A method of claim 1 wherein said camera is a TV camera having a vidicon tube which has a high sensitivity to said near ultraviolet rays of wavelength of approximately 4358A.

4. A method of discriminating a material radiant at high temperatures in a heating furnace as being radiant from outside the furnace, comprising:

previously placing a discrimination mark on the surface of said material to be heated in said furnace with a paint which is sensitive to near ultraviolet rays of wavelength of approximately 4358A, said paint being comprised of a manganese frit and a potassium silicate, charging said marked material into said furnace for radiant heating, projecting near ultraviolet rays of a high pressure mercury lamp from outside said furnace to said marked material radiant-heated in the furnace, said near ultraviolet rays having a wavelength of approximately 4358A, said painted discrimination mark being responsive to said near ultraviolet rays impinging thereon to produce a visual sharp-contrast indication between the unpainted surface portion and said discrimination mark of said marked material, and photographing the interior of said furnace while said material is radiant with a camera having a band-pass filter which transmits substantially exclusively said near ultraviolet rays of wavelength of approximately 4358A in front of the camera lens to discriminate the marked material while it is radiant.

5. A method of claim 4 wherein said camera is a TV camera having a vidicon tube which has a high sensitivity to said near ultraviolet rays of wavelength of approximately 4358A.

6. A method of discriminating a material radiant at high temperatures in a heating furnace as being radiant from outside the furnace, comprising:

previously placing a discrimination mark on the surface of a material to be discriminated from other materials to be heated in said furnace with a paint which is sensitive to near ultraviolet rays of wavelength of approximately 4358A, said paint being comprised of a zirconium frit and a potassium silicate, charging said marked material together with unmarked materials into said heating furnace for radiant heating, projecting near ultraviolet rays of a high pressure mercury lamp from outside said furnace to said materials radiant-heated in said furnace, said near ultraviolet rays having a wavelength of approximately 4358A, said painted discrimination mark being responsive to said near ultraviolet rays impinging thereon to produce a visual sharp-contrast indication between the unpainted surface portion and said discrimination mark of said marked material, and photographing the interior of said furnace while said materials are radiant with a camera having a band-pass filter which transmits substantially exclusively said near ultraviolet rays of wavelength of approximately 4358A in front of the camera lens to discriminate the marked material from the unmarked material while they are radiant.

7. A method of claim 6 wherein said camera is a TV camera having a vidicon tube which has a high sensitivity to said near ultraviolet rays of wavelength of approximately 4358A.

8. A method of discriminating a material radiant at high temperatures in a heating furnace as being radiant from outside the furnace, comprising:

previously placing a discrimination mark on the surface of said material to be heated in said furnace with a paint which is sensitive to near ultraviolet rays of wavelength of approximately 4358A, said paint being comprised of a zirconium frit and a potassium silicate, charging said marked material into said furnace for radiant heating, projecting near ultraviolet rays of a high pressure mercury lamp from outside said furnace to said marked material radiant-heated in the furnace, said near ultraviolet rays having a wavelength of approximately 4358A, said painted discrimination mark being responsive to said near ultraviolet rays impinging thereon to produce a visual sharp-contrast indication between the unpainted surface portion and said discrimination mark of said marked material, and photographing the interior of said furnace while said material is radiant with a camera having a band-pass filter which transmits substantially exclusively said near ultraviolet rays of wavelength of approximately 4358A in front of the camera lens to discriminate the marked material while it is radiant.

9. A method of claim 8 wherein said camera is a TV camera having a vidicon tube which has a high sensitivity to said near ultraviolet rays of wavelength of approximately 4358A.

* * * * *